United States Patent [19]

Patel et al.

[11] 4,400,188

[45] Aug. 23, 1983

[54] NITROGEN GENERATOR CYCLE

[75] Inventors: Suresh U. Patel, Whitehall; Thomas E. Cormier, Schnecksville; Keith B. Wilson, Allentown, all of Pa.

[73] Assignee: Air Products and Chemicals, Inc., Allentown, Pa.

[21] Appl. No.: 315,683

[22] Filed: Oct. 27, 1981

[51] Int. Cl.³ ............................................. F25J 3/02
[52] U.S. Cl. ................................... 62/13; 62/30; 62/31; 62/39
[58] Field of Search .................... 62/13–15, 62/18, 29–31, 38–39

[56] References Cited

U.S. PATENT DOCUMENTS

| | | | |
|---|---|---|---|
| 2,627,731 | 2/1953 | Benedict | 62/31 |
| 2,982,108 | 5/1961 | Grunberg et al. | 62/31 |
| 3,036,439 | 5/1962 | Haringhuizen | 62/13 |
| 3,105,360 | 10/1963 | Lehmer et al. | 62/13 |
| 3,447,332 | 6/1969 | Basin et al. | 62/13 |
| 3,492,828 | 2/1970 | Ruckborn | 62/13 |
| 3,508,412 | 4/1970 | Yearout | 62/13 |
| 3,535,886 | 10/1970 | Hoffman | 62/13 |
| 3,735,599 | 5/1973 | Izumichi et al. | 62/21 |
| 3,736,762 | 6/1973 | Toyama | 62/13 |
| 3,756,035 | 9/1973 | Yearout | 62/22 |
| 3,797,261 | 3/1974 | Juncker et al. | 62/40 |
| 4,222,756 | 9/1980 | Thorogood | 62/13 |

Primary Examiner—Frank Sever
Attorney, Agent, or Firm—Geoffrey L. Chase; E. E. Innis; J. C. Simmons

[57] ABSTRACT

A process is described in which gaseous nitrogen is recovered from air in a cryogenic air separation unit containing a single distillation column wherein the product nitrogen is compressed and a portion of the compressed nitrogen is recycled to the column to provide reboil in the bottom of said column and reflux at the top of said column. A waste crude oxygen stream is expanded to provide refrigeration for the air separation unit.

4 Claims, 2 Drawing Figures

NITROGEN GENERATOR CYCLE

TECHNICAL FIELD

The present invention relates to processes for the separation of air into its components. Specifically, the present invention is directed to the generation of essentially pure nitrogen gas from air without the recovery of the other components of the air in their individual forms. This invention is directed to the recovery of large volumes of nitrogen gas as would be suitable to be used in the enhanced recovery of petroleum.

BACKGROUND OF THE PRIOR ART

The prior art is replete with processes for the production of essentially pure nitrogen gas. Many of such processes are highly efficient for producing relatively small or medium quantities of nitrogen. However, at the relatively large quantities per day of nitrogen production which would be required by enhanced petroleum recovery operations utilizing nitrogen as a pressurizing or pressure maintaining phase, these known prior art processes have relatively reduced process efficiencies in comparison to the present invention.

In the production of nitrogen, the prior art has utilized various forms of apparatus including double columns and single columns. In addition, various flow streams to and from these columns have been utilized in attempting to provide the most efficient production of nitrogen.

U.S. Pat. No. 3,492,828 discloses several cycles including a cycle for the production of liquid nitrogen and liquid oxygen, FIG. 3. A minor amount of nitrogen gas can optionally be recovered. However, the nitrogen recycle includes partial compression, partial expansion and a column in which only one reflux stream is provided. Crude oxygen expansion is not utilized for the provision of refrigeration.

Exemplary of additional prior art is U.S. Pat. No. 4,222,756 to Robert M. Thorogood which discloses a two column nitrogen separation process and apparatus. The patented process is designed to produce large tonnages of nitrogen gas. In this patented process, the reflux and the reboil to the double column is supplied directly by the feed air stream and by directing nitrogen from the high pressure column to the low pressure column. Additional nitrogen generators of the prior art are set forth in the above-identified patent, all of which have a greater power requirement than the present invention at large tonnage capacity, from 15 MMSCFD up to 200 MMSCFD, or more.

The present invention provides a process and apparatus for the production of relatively large quantities of nitrogen, which has an efficiency over the prior art, such as Thorogood and the cycle disclosed in FIG. 4 of Thorogood, in the range of 1.5 to 7% savings in energy consumption. In addition, the prior art nitrogen generators have generally recovered around 50% of the overall nitrogen which is processed, whereas the present invention can recover preferably anywhere from 70 to 87% of the nitrogen processed, depending on the recyle stream flow rate. This recovery is achieved in part from the additional boil-up vapor flow and additional reflux flow provided by the recycle circuit of the present invention.

It is an object of the present invention to provide a nitrogen generator utilizing a single column.

It is another object of the present invention to provide a large quantity nitrogen generator which utilizes a nitrogen recycle to provide reboil and to augment the reflux to the single column of the generator unit.

It is yet another object of the present invention to provide an efficient recovery process and apparatus for large tonnages of nitrogen wherein process efficiencies are improved from 1.5% to 7% in power consumption over the prior art processes for nitrogen production in plants preferably of 15 MMSCFD to 200 MMSCFD.

BRIEF SUMMARY OF THE INVENTION

The present invention provides a process for the separation of essentially pure nitrogen gas in relatively large quantities from air which process comprises compressing the feed air stream, removing the moisture and carbon dioxide from the compressed feed air, cooling the air stream in a main heat exchanger against outwardly flowing process gas streams, introducing the cooled and compressed feed air into a single distillation column at a single, relatively high pressure, separating an essentially pure nitrogen overhead stream and a crude impure oxygen bottom stream from said column, splitting the nitrogen stream into a stream which is condensed and returned to the column as reflux and a gaseous nitrogen stream which is removed from the column, warming said gaseous nitrogen overhead stream against the incoming feed air stream in the main heat exchanger, compressing the now warmed nitrogen product stream and splitting off a nitrogen recycle stream from the remaining compressed nitrogen product stream, cooling the split-off nitrogen recycle stream in a heat exchanger, reboiling the bottom of said single column with the nitrogen recycle stream and then expanding the stream and refluxing the overhead of said column with the nitrogen recycle stream, removing a crude oxygen stream from the bottom of said column and expanding and introducing said stream into the condenser at the head of said column and removing said crude oxygen stream from the condenser overhead of said column and expanding the crude oxygen through an expander to produce refrigeration.

Preferably, the incoming feed air stream is freed of moisture and carbon dioxide by deposition of the same in the passages of a reversing heat exchanger. The depositions would be removed by the crude oxygen stream.

Alternately, the process may include a molecular sieve apparatus for removing the moisture and carbon dioxide from the feed air stream.

Alternately, a nitrogen product stream can be removed from the nitrogen stream before compression in a recycle compressor in order to provide a low pressure nitrogen stream.

The nitrogen generator of the present invention would be most economic for product requirements of 15 MMSCFD to 200 MMSCFD capacity, or more.

DETAILED DESCRIPTION OF THE INVENTION

Figure 1:
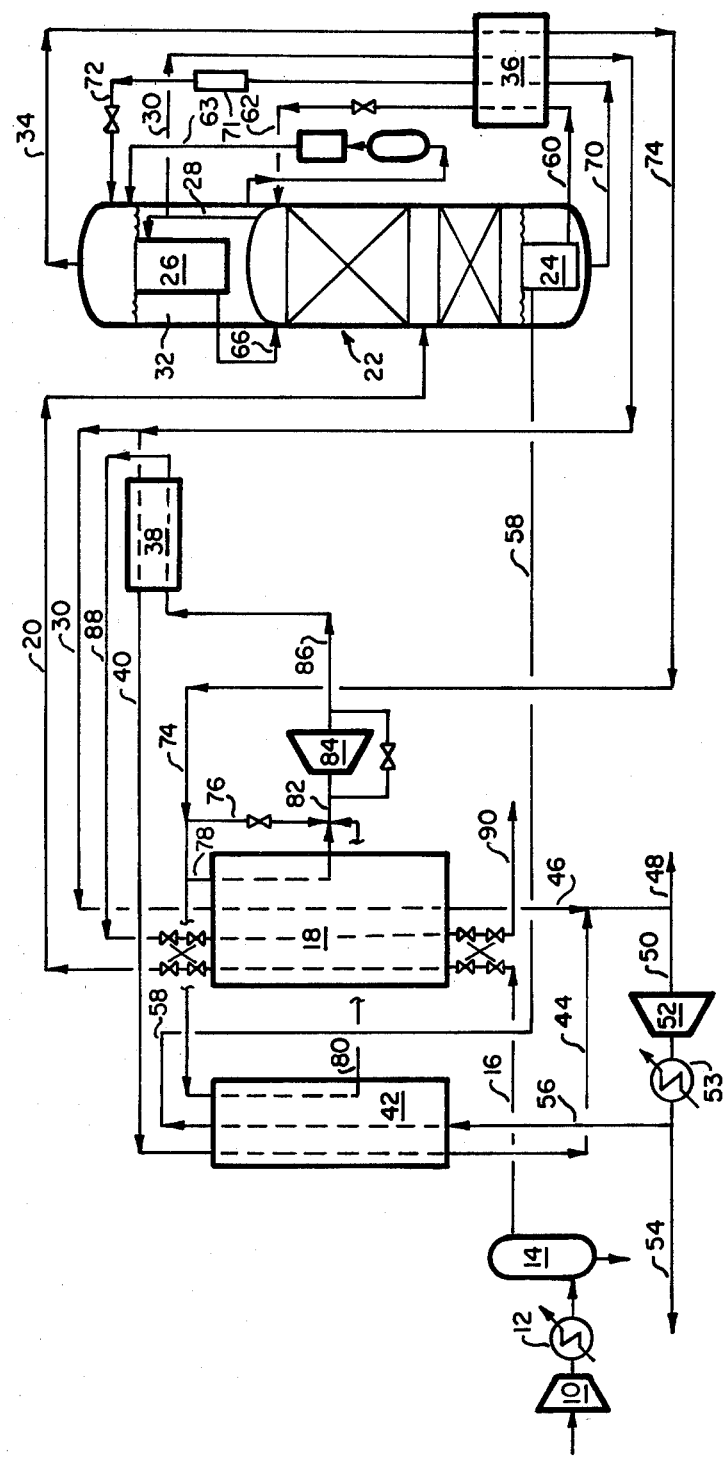
FIG. 1 shows a flow scheme for a nitrogen generator utilizing a reversing heat exchanger and showing the recycle heat pump cycle of the present invention.

The present invention will be described with respect to the several embodiments set forth in the flow schemes of the above described drawings. The first and preferred embodiment utilizes reversing heat exchangers to provide the necessary moisture and carbon dioxide removal in the nitrogen generator system. To provide the purified nitrogen, air is filtered and then compressed in main compressor 10 to about 100 psia before being cooled in after cooler 12. The compressed and cooled air stream is passed through a separator tank 14 wherein some moisture is condensed out and separated. The partially dried compressed air stream in line 16 is then directed through a reversing main heat exchanger 18. In the heat exchanger 18, the residual moisture and carbon dioxide in the feed air stream is condensed and solidified in the heat transfer passages. The air is periodically switched to flow through heat transfer passages previously used to warm the waste crude oxygen stream, and that stream is then passed through the passages previously used to cool the feed air stream. The moisture and carbon dioxide deposits evaporate into the crude oxygen stream and thereby are removed from the heat exchanger. This switching of the passage ways by the feed air stream and the product air stream is known as a reversing heat exchanger and effectively removes the condensibles from the feed air stream prior to distillation of the air. The reversing function is achieved by various valve members at both the warm and cold end of the heat exchanger. The reversing heat exchanger is known in the prior art and it is deemed to be sufficiently explained herein without further elaboration. After passage through the valve assembly at the cold end of the heat exchanger 18, the dry and cool air flows through feed air line 20 to the distillation column 22.

The feed air stream in line 20 is introduced into the column at an intermediate tray. The column operates at a pressure of about 93 psia. The distillation column 22 includes an indirect reboil heat exchanger 24 and an indirect reflux heat exchanger or reflux condenser 26. The feed air stream which is introduced through line 20 to the distillation column 22 is separated into a nitrogen product which collects at the head of the distillation column and a crude oxygen stream which collects at the bottom of the distillation column.

Essentially pure nitrogen is drawn off the top of the distillation column 22 through line 28 as an overhead nitrogen stream. A portion of the nitrogen is passed through the reflux condenser 26. The condensed nitrogen is returned via line 66 to the head of the column where it provides part of the reflux. A portion of the nitrogen from line 28 is withdrawn in line 30 and warmed in subcooler heat exchanger 36. The warmed nitrogen in line 30 is then split into a side stream 40 and the remaining stream 30. The remaining stream in line 30 is reintroduced into the main heat exchanger 18. The side stream in line 40 is further warmed in heat exchanger 38 and then introduced into the recycle heat exchanger 42. Both streams provide cooling for the respective heat exchangers. The nitrogen streams from line 30 and 40 are then combined after heat exchanging in lines 46 and 44 respectively. A small portion of the combined stream in line 50 can be removed in line 48 for reactivation and purge duty. The major and remaining stream in line 50 is then compressed in nitrogen compressor 52 and cooled in aftercooler 53. The essentially pure and pressurized nitrogen product then exits through line 54. Alternately the product nitrogen can be removed as a stream in line 48 before compression to provide a low pressure nitrogen product stream or a high pressure compressed stream can be removed as well as a low pressure stream. Approximately 40% of the nitrogen product flow is removed in a side stream in line 56 which is recycled to the cold equipment, while 60% of the nitrogen can be removed as product in line 54 or 48. The recycled nitrogen is cooled in recycle heat exchanger 42 before being directed through line 58 to the reboil heat exchanger 24 in the bottom of the distillation column 22. In the reboil heat exchanger 24, the nitrogen is condensed to a liquid while the crude oxygen surrounding the reboil heat exchanger is partially vaporized thus providing reboil to the distillation column.

The liquified nitrogen now in line 60 is subcooled in subcooling heat exchanger 36 before being flashed through an expansion valve and reintroduced to the head of the column 22 as reflux from line 62.

By recycling this portion of the product nitrogen stream, vapor boil up is achieved at the reboil heat exchanger 24 and additional reflux is provided by the liquefied nitrogen product in line 62 being introduced into the head of the column after expansion. Therefore, this single pressure column utilizes both the reflux of the initial air feed stream and nitrogen stream 66 as well as the reflux and reboil of the nitrogen recycle heat pump cycle. It is this dual function of the nitrogen stream which adds additional reflux and reboil which is important to the greater efficiency of this process system in comparison to prior art systems.

The oxygen liquid which forms in the base of the column 22 is withdrawn as a crude, impure oxygen bottom stream in line 70 and passed through subcooler 36 and hydrocarbon removal equipment 71 before being expanded through a valve in line 72 and introduced into the low pressure side of the reflux condenser 26. The oxygen introduced into the low pressure side of the reflux condenser 26 through line 72 boils in heat exchange against the condensing nitrogen. The condensed nitrogen is returned to the column through line 66 for use as a liquid reflux. The thus vaporized crude oxygen is withdrawn from the low pressure side of the reflux condenser 26 in line 34 before being warmed in subcooling heat exchanger 36 and then passed through line 74 to the recycle and main heat exchangers 42 and 18 respectively. The crude oxygen stream in line 74 may be split into 3 separate streams; by-pass stream 76, main heat exchanger reheat stream 78, and recycle heat exchanger reheat stream 80. All of the streams 76, 78 and 80 are combined into stream 82 which is then expanded through expander turbine 84. The expanded and cooled crude oxygen gas is then conducted through line 86 to the superheater heat exchanger 38. The expanded crude oxygen in line 6 warms the nitrogen product in line 40 in the superheater heat exchanger 38. The crude oxygen now in line 88 is rewarmed in main heat exchanger 18 against the incoming feed air stream. The further rewarmed crude oxygen is vented through line 90 as a waste stream containing considerable nitrogen, carbon dioxide and water impurities therein. A small liquid stream is withdrawn from the low pressure side of reflux condenser 26 and is passed through a guard absorber to prevent hydrocarbon build-up. This stream then passes through a partial vaporizer and re-enters the condenser section. This short hydrocarbon adsorption cycle 63 is shown adjacent to the upper portion of the column 22.

Figure 2:
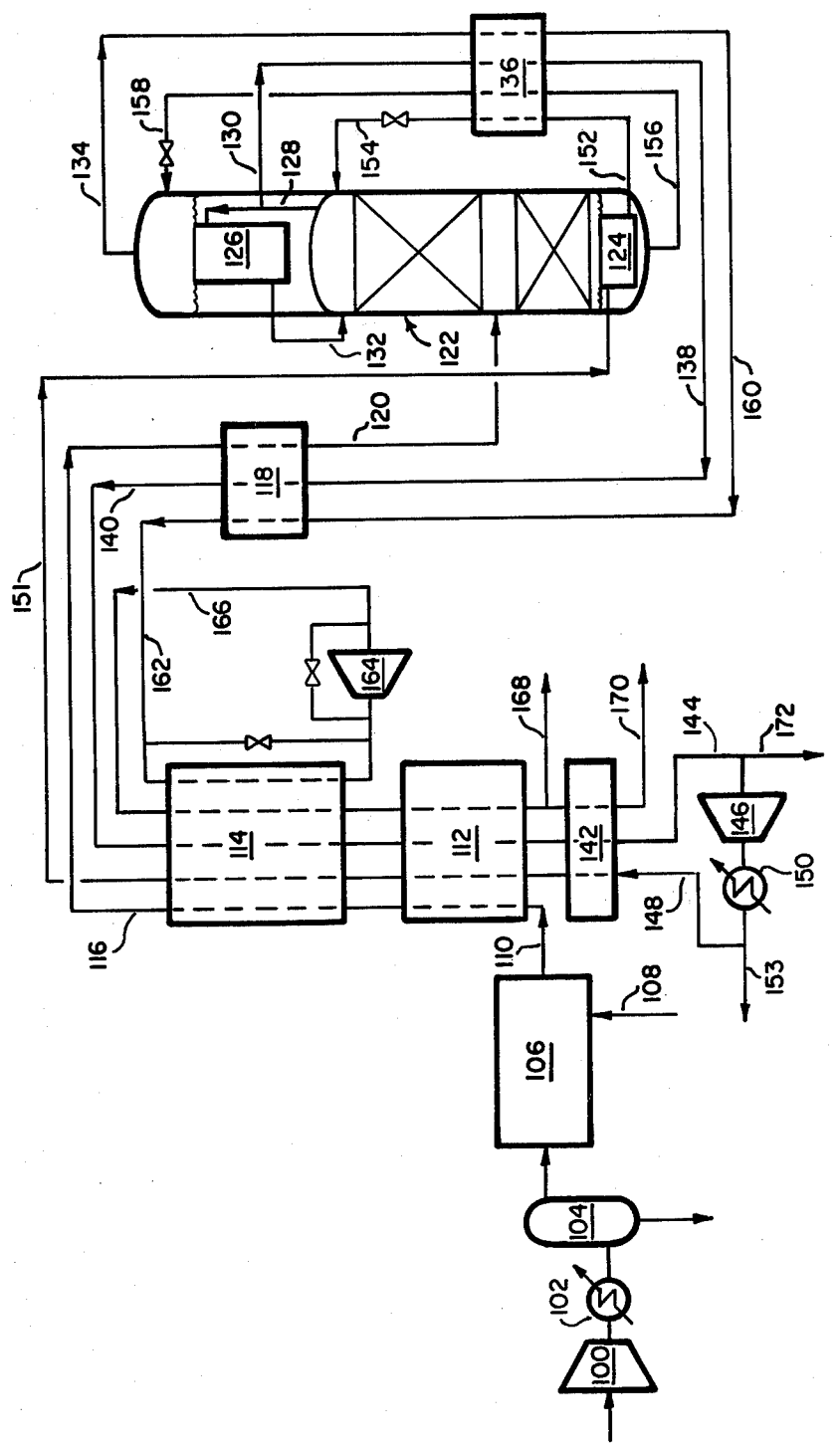
FIG. 2 shows the molecular sieve embodiment of the flow scheme of the present invention utilizing a recycle heat pump cycle for nitrogen generation in a single column.

In FIG. 2, the second preferred embodiment of the present invention is disclosed. This embodiment utilizes molecular sieves for removal of water, hydrocarbons and carbon dioxide from the feed air stream to the distillation column. With respect to the recycle nitrogen heat pump aspect of the invention the two embodiments are identical. Therefore, only a brief discussion of the process flow scheme is deemed necessary. A filtered feed air stream is compressed in compressor 100 and cooled in an after cooler 102 before being separated of condensates in the separater tank 104.

The air stream is then further cooled in a refrigeration unit and then cleansed of any residual water and carbon dioxide in the molecular sieve unit 106. This unit may contain a plurality of molecular sieve containers in order to provide a switching action to allow for continuous air cleaning and reactivation of a used sieve bed. The cleansed air stream in line 110 is then passed through warm heat exchanger 112 and cold heat exchanger 114. The cooled feed air is then passed through line 116 and heat exchanger 118 to be introduced into the distillation column 122 by line 120. The feed air stream is introduced to the column at an intermediate tray level. An essentially pure overhead nitrogen stream is removed in line 128 and further split into a condenser feed to condenser 126 and a gaseous nitrogen stream 130. The gaseous nitrogen stream in line 130 passes through heat exchanger 136 and by way of line 138 through heat exchanger 118. The gaseous nitrogen stream in line 140 then is passed through heat exchanger 114, 112 and 142. The nitrogen stream now in line 144 is compressed in compressor 146 cooled in aftercooler 150 and a side stream is recycled by line 148. The product is withdrawn in line 153. Alternately all or a portion of the nitrogen product can be removed before compression to provide a low pressure nitrogen stream through line 172.

The recycle stream in line 148 then returns to the distillation column through the heat exchangers 142, 112 and 114 before being introduced into the reboil heat exchanger 124. The gaseous nitrogen is condensed in the reboil heat exchanger 124 while at the same time providing crude oxygen vapor that passes up through the column. The condensed nitrogen from the reboiler exchanger 124 passes through line 152 and subcooler heat exchanger 136 before being flashed in an expansion valve and introduced into the head of the column 122 through line 154.

A portion of the nitrogen stream in line 128 is conveyed to the reflux condenser 126 where the nitrogen is cooled to condensation and the condensed nitrogen is returned by line 132 as reflux to the main distillation column 122. The crude oxygen from the bottom of column 122 is removed by line 156 and passed through the subcooler heat exchanger 136. The cooled crude oxygen is then expanded and introduced into the low pressure side of the reflux condenser 126 in line 158. The crude oxygen is vaporized against the condensing nitrogen in the reflux condenser 126. The resulting vaporized crude oxygen is removed through line 134 and passed through subcooler heat exchanger 136. The crude oxygen is further removed in line 160 through heat exchanger 118. From that heat exchanger the crude oxygen product is introduced into the main heat exchanger 114 by line 162. The crude oxygen is then expanded through expander turbine 164 and reintroduced into the main heat exchanger via line 166. The crude oxygen in line 166 is also passed through heat exchangers 112 and 142. A portion of the crude oxygen is removed in line 168 to be utilized for reactivation of the molecular sieves. The remainder of the crude oxygen stream containing for example from 50% to 70% oxygen, depending on the nitrogen recovery is vented as waste to the atmosphere.

Again, as in the first embodiment of the present invention, the recycle of a portion of the nitrogen product to the reboiler and the head of the single distillation column allows for the use of a single column by providing reboil to the column and by the supplementation of reflux in addition to that provided by the cooled and compressed air stream feed.

Both of the embodiments described above provide for the production of relatively large quantities of nitrogen while achieving economies of energy consumption for the production of that nitrogen in the range of 1.5 to 7%. Typically, this energy economy is evidenced with system sizes of 15 MMSCFD or more. For example a 76 MMSCFD plant would achieve a 5.3% efficiency improvement over the typical prior art plants, such as the cycle taught in FIG. 1 of U.S. Pat. No. 4,222,756. By comparison, the present invention has a specific power of 0.214 KWh/Nm$^3$ for a plant size of 76 MMSCFD at 90 psia, but the cycle taught in FIG. 1 of U.S. Pat. No. 4,222,756 has a specific power of 0.226 KWh/Nm$^3$ for a 76 MM plant at 90 psia.

The present invention is described in detail with respect to the two embodiments set forth above. However, it is deemed that the invention would define alternate methods for performing the same function such as the molecular sieve unit of the second embodiment and the reversing heat exchangers of the first embodiment. Therefore, the extent of the invention should be determined by the claims that follow.

What is claimed:
1. A process for the separation of large tonnages of essentially pure nitrogen gas from air comprising the steps of:
   (a) compressing and after cooling a feed air stream;
   (b) removing the moisture and carbon dioxide from said compressed air stream;
   (c) cooling said air stream in a heat exchanger against crude oxygen and product nitrogen streams;
   (d) introducing the cooled and compressed air stream into a single distillation column;
   (e) separating an essentially pure nitrogen overhead stream and a crude, impure oxygen bottom stream from said column;
   (f) splitting the nitrogen overhead stream into a stream which is condensed against boiling crude oxygen and returned as reflux to the head of the distillation column, and a gaseous nitrogen stream which is removed from the column;
   (g) warning said gaseous nitrogen stream against the incoming feed air stream and a recycle nitrogen stream in said heat exchanger;
   (h) compressing and aftercooling the gaseous nitrogen stream and splitting the compressed stream into a gaseous nitrogen product and a recycle nitrogen stream which is cooled in said heat exchanger;
   (i) reboiling the bottom of said column by heat exchange with said recycle nitrogen stream while cooling and condensing said stream;
   (j) introducing the recycle nitrogen stream into the head of the distillation column as reflux by cooling the stream against the nitrogen product stream and a crude oxygen overhead stream and then expanding the cooled recycle nitrogen stream;

(k) removing a crude liquid oxygen stream from the bottom of said column and cooling said stream against the essentially pure nitrogen product stream and a vaporized crude oxygen stream before expanding and introducing the same into the low pressure side of the condenser at the head of said column;

(l) removing said vaporized crude oxygen stream from the condenser overhead of said column and warming it against the nitrogen recycle stream and the feed air stream before expanding the crude oxygen through an expander to produce refrigeration for the process.

2. The invention of claim 1 wherein the feed air stream is freed of moisture and carbon dioxide by deposition of said impurities in a reversing heat exchanger.

3. The invention of claim 1 wherein the feed air stream is freed of moisture and carbon dioxide in a regenerable molecular sieve absorber.

4. The invention of claim 1 wherein a low pressure nitrogen product is removed prior to the compression step of paragraph (h) of claim 1.

* * * * *

UNITED STATES PATENT AND TRADEMARK OFFICE
CERTIFICATE OF CORRECTION

PATENT NO. : 4,400,188
DATED : August 23, 1983
INVENTOR(S) : Suresh U. Patel, et al It is certified that error appears in the above-identified patent and that said Letters Patent is hereby corrected as shown below:

Column 6, Line 57
Delete "warning" and substitute therefor -- warming --

Signed and Sealed this

Twenty-fifth Day of June 1985

[SEAL]

Attest:

DONALD J. QUIGG

Attesting Officer    Acting Commissioner of Patents and Trademarks